US005415918A

United States Patent [19]

Lang et al.

[11] Patent Number: 5,415,918

[45] Date of Patent: May 16, 1995

[54] FUNCTIONAL EMBOSS DESIGN FOR MULTI-PLY NAPKINS

[75] Inventors: Frederick J. Lang, Neenah; David J. Martin, Appleton, both of Wis.

[73] Assignee: James River Corporation of Virginia, Richmond, Va.

[21] Appl. No.: 171,749

[22] Filed: Dec. 22, 1993

[51] Int. Cl.$^6$ .......................... B32B 3/04; D06N 7/04

[52] U.S. Cl. .................................... 428/154; 428/153; 428/156; 428/172; 428/284; 428/913

[58] Field of Search ......................... 264/284; 156/209; 428/195, 57, 81, 98, 192, 154, 153, 156, 172, 284, 913; D5/53; 162/109, 123

[56] References Cited

U.S. PATENT DOCUMENTS

| | | | |
|---|---|---|---|
| D. 10,102 | 7/1877 | Fisher | D5/99 |
| D. 164,582 | 9/1951 | Housen | D5/99 |
| D. 262,747 | 1/1982 | Erickson | D59/2 B |
| D. 265,519 | 7/1982 | Appleman | D59/2 B |
| D. 288,150 | 2/1987 | Schulz et al. | D59/1 |
| D. 298,488 | 11/1988 | Eliason | D5/53 |
| D. 298,586 | 11/1988 | Drew et al. | D5/53 |
| D. 298,587 | 11/1988 | Peddada | D5/53 |
| D. 298,588 | 11/1988 | Peddada | D5/53 |
| D. 298,589 | 11/1988 | Drew et al. | D5/53 |
| D. 298,590 | 11/1988 | Drew et al. | D5/53 |
| D. 298,701 | 11/1988 | Drew | D5/53 |
| D. 298,702 | 11/1988 | Drew | D5/53 |
| D. 305,181 | 12/1989 | Veith | D5/53 |
| D. 305,182 | 12/1989 | Peddada et al. | D5/53 |
| D. 312,356 | 11/1990 | Beattie | D5/57 |
| D. 318,572 | 7/1991 | Schultz et al. | D5/53 |
| D. 319,349 | 8/1991 | Schultz et al. | D5/53 |
| D. 319,350 | 8/1991 | Paschke et al. | D5/53 |
| D. 322,173 | 12/1991 | Schultz et al. | D5/53 |
| D. 327,776 | 7/1992 | Hodges | D5/4 |
| D. 331,665 | 12/1992 | Underhill | D5/53 |
| D. 332,874 | 2/1993 | Shufelt et al. | D5/53 |
| D. 332,875 | 2/1993 | Shufelt et al. | D5/53 |
| D. 332,876 | 2/1993 | Shufelt et al. | D5/53 |
| 1,929,924 | 10/1933 | Jopson | 41/24 |
| 3,673,060 | 6/1972 | Murphy et al. | 161/126 |
| 4,493,868 | 1/1985 | Meitner | 428/171 |
| 4,759,967 | 7/1988 | Bauernfeind | 428/154 |
| 4,803,032 | 2/1989 | Schulz | 264/284 |
| 5,093,068 | 3/1992 | Schulz | 264/284 |
| 5,158,523 | 10/1992 | Houk et al. | 493/396 |

OTHER PUBLICATIONS

"5 Beautiful New Ways to Say Kleenex Towels," Sunday Magazine, The Washington Star, Dec. 10, 1967.

"Bounty's New Design Collection," The Washington Post, Nov. 25, 1979.

*Primary Examiner*—Patrick J. Ryan
*Assistant Examiner*—William A. Krynski
*Attorney, Agent, or Firm*—Finnegan, Henderson, Farabow, Garrett & Dunner

[57] ABSTRACT

A multi-ply napkin having a functional emboss design containing an embossed edge, an embossed folded edge, and an unembossed wiping surface.

18 Claims, 16 Drawing Sheets

FUNCTIONAL EMBOSS DESIGN FOR MULTI-PLY NAPKINS

BACKGROUND OF THE INVENTION

1. Field of the Invention

The present invention relates to embossed napkins. More particularly, the invention relates to napkins having a functional emboss design.

2. Description of the Related Art

Nearly all napkins, particularly multi-ply napkins, are embossed over some portion of the napkin's surface. A common functional reason to emboss multi-ply napkins is to bond individual plies together. This is usually accomplished with a coin edge emboss pattern, although other emboss patterns and ply-bonding techniques may also be used. Another common reason to emboss is to improve the attractiveness of the napkin to the consumer.

One of the long standing problems facing manufacturers of quality embossed napkins has been how to deliver to the consumer an attractive, undamaged, package of napkins that stacks and displays well on the store shelf. Many napkin packages are not rectilinear due to uneven bulk distribution in the individual napkins and, consequently, do not stack well on the shelf. Other napkins often buckle or pucker in the case during shipping and appear damaged, leading consumers to reject them.

To avoid these problems, some manufacturers have chosen to box their napkin products. However because boxes can add significantly to the expense of the napkins, most napkin stacks are generally simply overwrapped with polyethylene film. Various embossing and folding approaches have been developed to address the uneven bulk distribution and stackability problems of overwrapped napkin packages. However, it seems that many emboss patterns are chosen based more on aesthetics, with less attention paid to the effects the design may have on wrapping, shipping, and performance characteristics of the napkin products.

To produce tightly wrapped, square packages that stack well on the store shelf, it is important to achieve even or uniform napkin bulk. Package corners must be at substantially the same stack height for stackability. Uneven napkin bulk produces stacks that lean or tip over. Depending on the bulk distribution, uneven napkin bulk can also cause the product to buckle or pucker within the package.

A napkin package's resistance to puckering during handling, shipping, and storage, is, among other things, dependent on how tightly the wrapped package is packed into the case, the firmness of the wrapped package and the design of the emboss pattern.

Finally, the performance of the product in the hands of the consumer is key to the success of the product. The napkin must be attractive. The emboss design dictates how well the individual plies hold together and the availability of smooth, unembossed areas for wiping comfort. The design and folded format of the napkin also determine whether the napkin can be refolded in a variety of ways.

Three main embossing approaches are currently in practice and involve embossing: only the edge; the entire napkin; or the edge along with other selected spots. Each approach is reviewed below.

The first approach produces a napkin that has only an edge emboss. The emboss patterns applied to most of the area of an edge and extending fully to the edge in substantially complete coverage of the area adjacent the edge are usually termed "coin edge embosses." The advantages of this approach are that it is possible to get good ply-bonding and it leaves a large, smooth surface for wiping the face and hands. The napkin bulk and consequently the napkin stack, however, is uneven so this design leads to a wrapped product that is vulnerable to puckering. Furthermore, because of uneven bulk, the wrapped napkin package has at least one low corner which in turn can cause stacks of the packages to tip over, or individual packages to slide off each other. This defect becomes more pronounced as the stack height of the package increases.

The second approach embosses the entire napkin surface area. The advantage of an overall emboss is that uniform stack bulk is achieved, which promotes good packaging and shelf performance. Ply-bonding tends to be poor, however, because it is difficult to attain the high pressures needed in the emboss nip with the increased emboss area. In addition, the entire napkin surface is embossed leaving no smooth unembossed area for wiping, thus detracting from both the softness and attractiveness of the napkin.

Spot embossing, the third approach, embosses other spots of the napkin along with the traditional embossed edge. This approach generally involves the placement of various sized emboss elements to increase the attractiveness of the folded napkin. The advantages of this approach fall between the extremes of the two previous approaches in that the bulk of the napkin stack can start to approximate that of the overall emboss approach while still preserving some of the ply-bonding characteristics of the coin edge embossed only approach.

Similarly, the disadvantages are a combination of the above two approaches. Lumpy or uneven bulk can lead to product puckering and poor stacking. In addition, too many elements detract from the attractiveness of the napkin, decrease the smooth area available for wiping, and may lower the strength of the ply-bonding. The comparative advantages and disadvantages of the napkin of the present invention and the napkins described above are summarized in Example 1 below.

The napkins described above are most commonly quarter folded, i.e., folded in half twice to form another but smaller nearly square napkin. In some cases, however, napkins produced by any of the above approaches are eighth folded, instead of the more traditional quarter fold. This format may be used for consumer convenience or for manufacturing convenience as the eighth fold can further level out the bulk profile. An eighth fold napkin format, however, does not permit the consumer to refold the napkin in alternative ways without the residual eighth fold being apparent. For example, consumers often prefer a triangular or diamond fold in the napkin when it is placed on the table top. These designs are easily produced from quarter-fold napkins by folding along diagonals. However with an eighth-fold napkin, the last fold generally spoils the aesthetics of the design.

In light of the foregoing, there is an immediate need for a napkin which eliminates or reduces puckering, provides better resistance to puckering during shipping and handling, and has engineered pucker points to reduce the severity of the degradation in appearance caused by puckering. In addition, a napkin is desired that has uniform stack bulk to produce a quality overwrapped package that is a right-angled parallelepiped that stacks well on the store shelf, has good ply-bonding, a large unembossed smooth wiping area, is attractive, and allows the consumer maximum folding flexibility.

SUMMARY OF THE INVENTION

Accordingly, the present invention is directed to an embossed napkin that substantially obviates one or more of the problems due to limitations and disadvantages of the related art.

To achieve these and other advantages and in accordance with the purpose of the invention, as embodied and broadly described, the invention relates to a napkin having a functional emboss design comprising an embossed edge, an embossed folded edge and an unembossed wiping surface. Preferably, the napkin is a multiply paper napkin.

In another aspect, the invention relates to a multi-ply napkin having a functional emboss design with increased resistance to puckering and an even bulk distribution, comprising an embossed edge, an embossed folded edge and an unembossed wiping surface.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate embodiments of the invention and together with the description serve to explain the principles of the invention.

DETAILED DESCRIPTION OF THE INVENTION

The present invention provides a multi-ply napkin having a functional emboss design, comprising an embossed edge, an embossed folded edge, and an unembossed wiping surface.

Reference will now be made in detail to the present preferred embodiments of the invention, examples of which are illustrated in the accompanying drawings.

Figure 1:
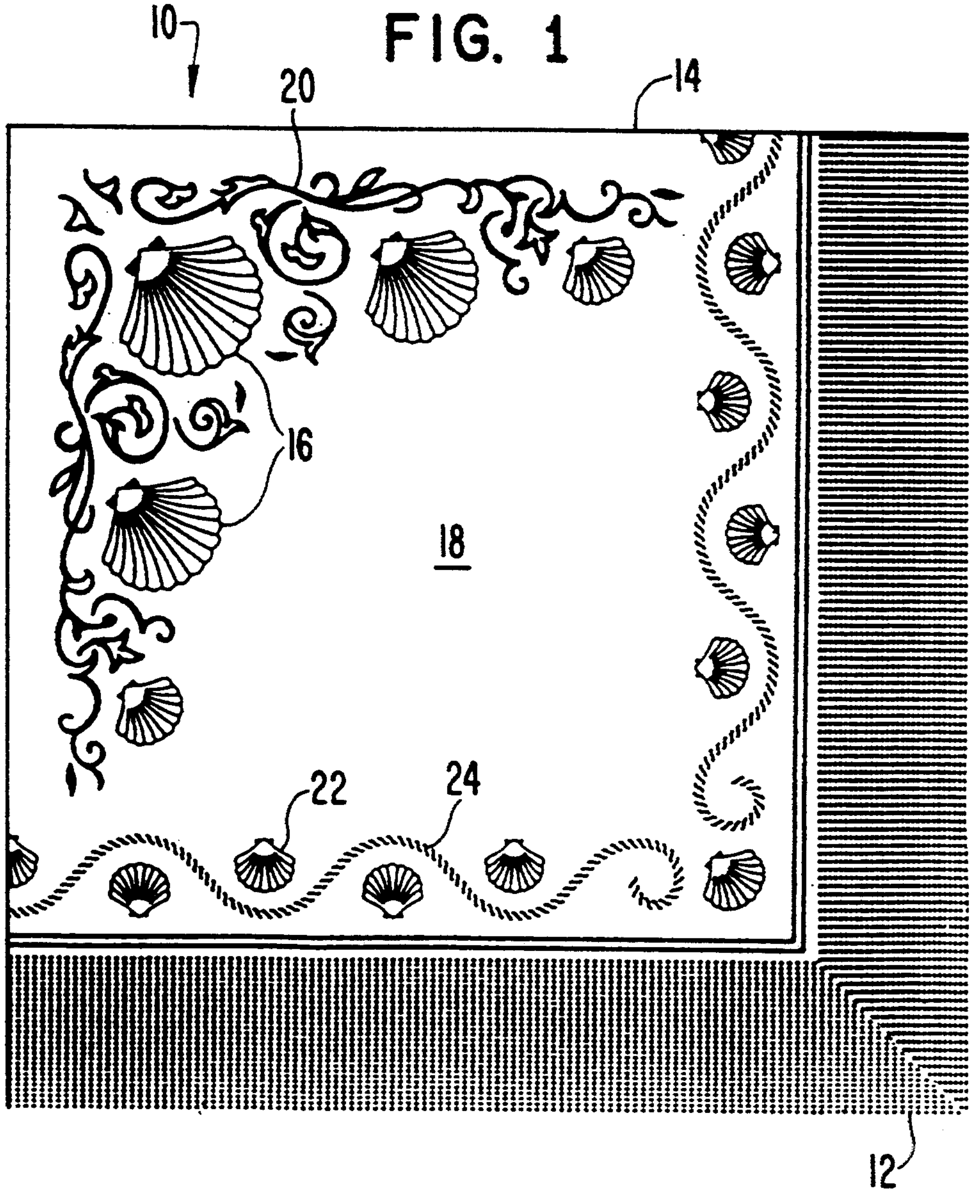
FIG. 1 is a plan view of a quarter folded napkin of the present invention combining discrete elements and a continuous "vine" design along the fold lines in a design which is suitable for "all occasion" napkins.
Figure 2:
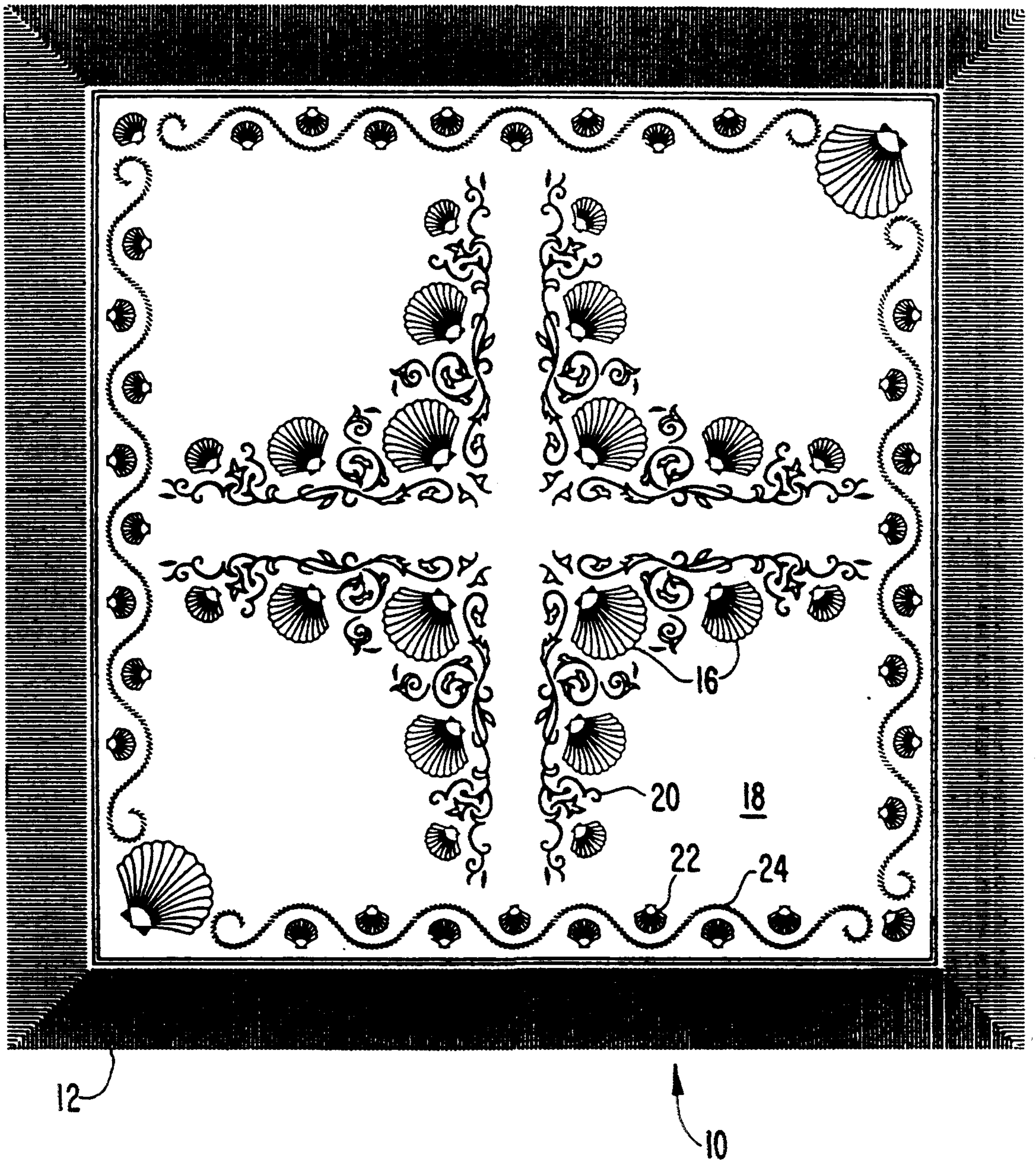
FIG. 2 is a plan view of the unfolded napkin of FIG. 1.

An exemplary embodiment of a quarter folded multiply napkin of the present invention is shown in FIG. 1 and is designated generally by reference numeral 10. The unfolded napkin of FIG. 1 is shown in FIG. 2. Like or similar parts are identified throughout the drawings by the same reference characters.

The edge 12 shown in FIG. 1 is a traditional coin edge emboss and is produced by well known methods such as those described in U.S. Pat. Nos. 1,929,924; 5,158,523 and 5,093,068. In accordance with the invention, other emboss patterns may be used in place of the coin edge. As shown in FIG. 2, the entire outer, peripheral edge of the napkin 10 is preferably embossed, to ensure sufficient ply-bonding. If some other means of ply-bonding is employed, such as for example an adhesive, less aggressive embosses may be used.

The napkin 10 has at least one, and preferably two, embossed interior folded edges 14. According to the present invention, both interior folded edges are preferably embossed to provide even bulk distribution and to reduce buckling failure.

The folded edge 14 contains at least two discrete, principal or primary emboss elements 16 or one continuous, or connected, element of equal effect. The embodiment shown in FIG. 1 has three discrete, principal elements 16 along each of the interior folded edges 14.

Although the present invention is not limited to a specific number of discrete or continuous emboss elements along a folded edge, through experimentation and evaluations of specific emboss element placements, the inventors determined the key element locations required to optimize functional and packaging needs and which provide design aesthetics. Using test methods developed to measure buckling loads, it was discovered that embossing along the interior folded edge(s) of an embossed napkin increases a napkin stack's resistance to buckle or pucker (i.e., increased buckling load) while simultaneously creating the even bulk distribution needed to produce a square stack and package. Buckling load is thus believed to be an indicator of how well the wrapped packages withstand handling stresses in the shipping case without puckering, which degrades the attractiveness of the product to the consumer when placed on the store shelf as it is sometimes considered to be damaged.

The inventors have further determined that adding additional elements towards the interior of the folded napkin, although expected to increase the measured buckling load, produced slight gains compared to napkins having emboss elements just along the folded edges. In fact, in some cases, continuing to add elements to the interior was surprisingly found to decrease the buckling loads. These experiments demonstrated that simple embossing of areas along the folded edge of napkins that are already coin edge embossed is optimal from buckling load and wiping surface viewpoints.

It also was determined during the course of investigations that puckering usually occurred in the unembossed or least embossed edge regions of the napkins. This discovery permitted the inventors to design the locations of puckering into the emboss pattern.

Further study revealed that as the number of pucker points increased, the magnitude of each individual pucker decreased. In other words, a product with no emboss elements or only one emboss element along the folded edge tends to exhibit one catastrophic and obvious pucker point, whereas napkins containing several discrete emboss elements, or an equivalent continuous emboss element, along the folded edges tended to have several smaller and less objectionable pucker points. Thus, an emboss pattern can be designed so that the packaged product still looks attractive to the consumer even though it puckers during shipping and handling.

In accordance with the present invention, in one embodiment (not shown), the placement of as few as 2 discrete elements, evenly spaced, along the folded edge, produced increased buckling loads with multiple pucker points. This effect is more noticeable in larger stacks having higher counts of napkins, being more distinctly observed in stacks of 100 than in stacks of 40. In a more preferred embodiment of the invention shown in FIG. 1, three evenly spaced discrete principal elements 16 are placed along the folded edge. Alternatively, one continuous element having substantially equivalent surface area may be placed along the folded edges. See, e.g., Example 3.

Secondary emboss elements 20 may be located between and around the primary elements 16, and are functional in that they channel the pucker points and improve the attractiveness of the design. Continuous "vine"-like emboss elements are used as secondary elements in FIGS. 1 and 2, but the present invention is not limited to "vine"-like secondary elements.

In accordance with the present invention, the primary and secondary elements 16 and 20 are not limited to the exemplary shells and vines shown in FIGS. 1 and 2. Other styles and shapes of elements may be chosen without departing from the scope of the invention. Typically, in view of normal manufacturing tolerances, embossed regions along the folded edge should preferably be recessed slightly therefrom so that the fold will not fall directly upon a heavily embossed region. About $1/16^{th}$ to $\frac{3}{8}^{th}$ inch, preferably $\frac{1}{8}^{th}$ to $5/16^{th}$is usually satisfactory.

In accordance with the present invention, and as shown in FIGS. 1 and 2, the innermost edge, closest to the embossed edge 12 may contain additional functional and aesthetic emboss elements such as shells 22 and rope 24. As above, these additional elements 22 and 24 may be altered in style, shape and size.

In the embodiment of FIGS. 1 and 2, there are four (4) possible pucker points created by the emboss patterns along each folded edge. These pucker points are between the rope 24 and vine 20, the 1st and 2nd shells, the 2nd and 3rd shells, and the 3rd shell and fold edge 14.

The unembossed smooth wiping surface 18 of the napkins of the present invention preferably accounts for at least about 10%, more preferably, from about 10% to about 45% of the surface area of the entire napkin, most preferably from about 15% to about 35% of the surface area of the entire napkin.

Figure 3:
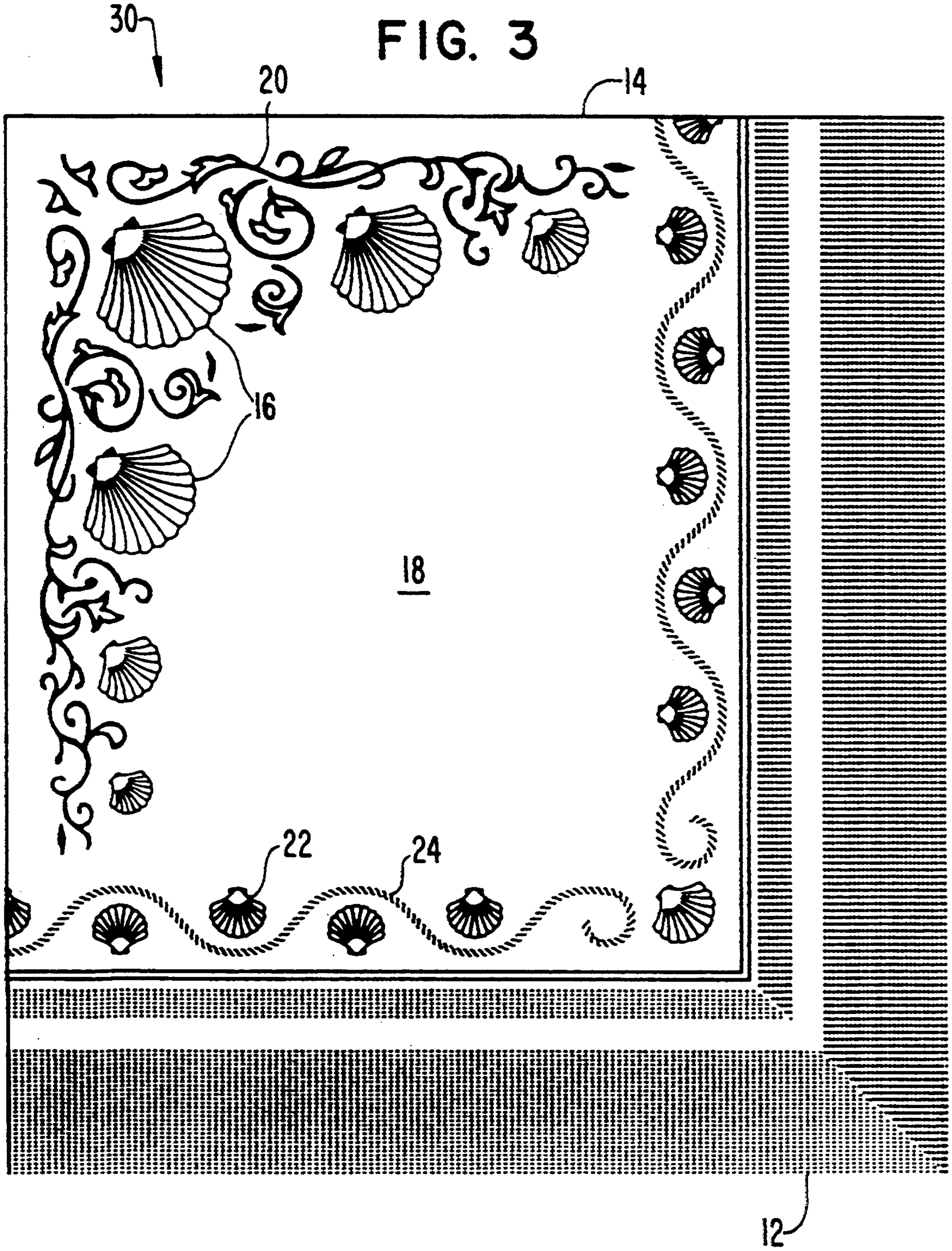
FIG. 3 is a plan view of another embodiment of a quarter folded napkin of the present invention which is more suitable for larger napkins such as are sold as "elegant dinner" napkins.
Figure 4:
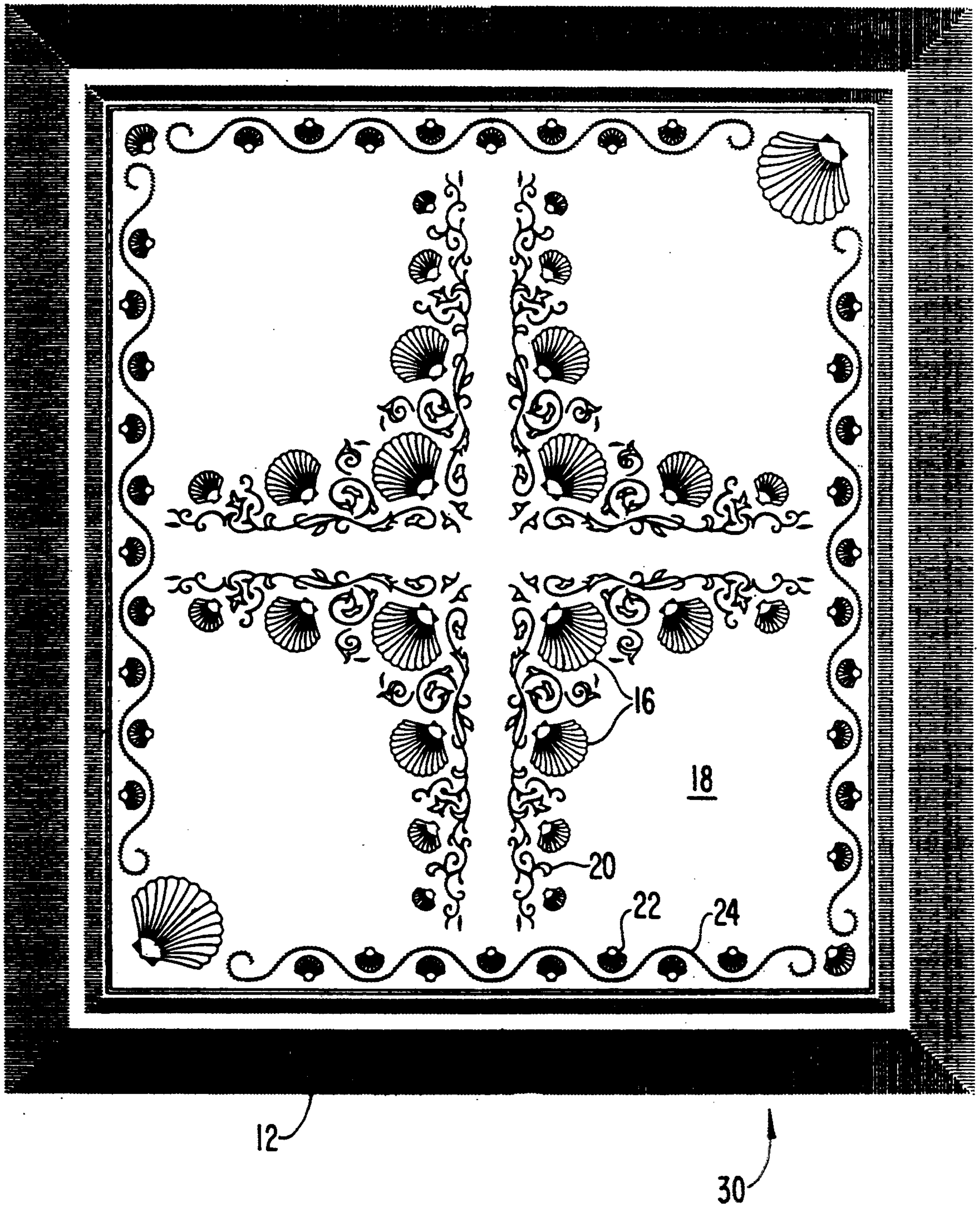
FIG. 4 is a plan view of the unfolded napkin of FIG. 3.

In accordance with another embodiment of the invention shown in FIGS. 3 and 4, napkin 30 is nearly identical in all respects to napkin 10 illustrated in FIGS. 1 and 2, except that there are 4 discrete, principal elements 16, along the half folded edge and 3 discrete, principal elements 16 along the quarter folded edge. For napkins which are not substantially square, it is preferable to place more emboss elements along the longer folds of the napkin.

The following examples are illustrative and not intended to limit the invention:

EXAMPLE 1

Napkins having the design illustrated in FIGS. 1 and 2 were produced on full scale commercial equipment from 2 plies of 10 lb/3000 sq. ft. ream tissue embossed together at a run-in depth of about 0.010–0.012 inch using paper to steel embossing. Machine wrapped packages of 100 count were placed in configurations comparable to those used for store shelves to illustrate the superior performance and appearance of poly-wrapped packs of napkins embossed according to the present invention. Similarly, competitive and prior art napkins packs were placed in the same configurations for comparative purposes.

Figure 14:
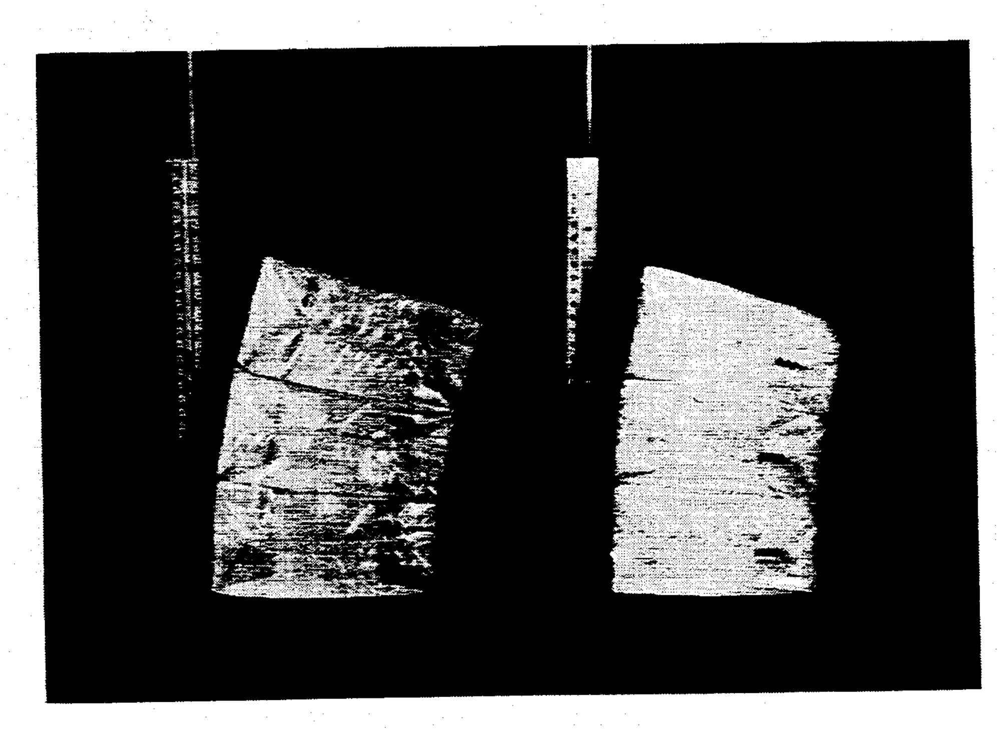
FIGS. 14 and 15 are photographs illustrating the appearance of stacks of napkins according to the prior art.
Figure 15:
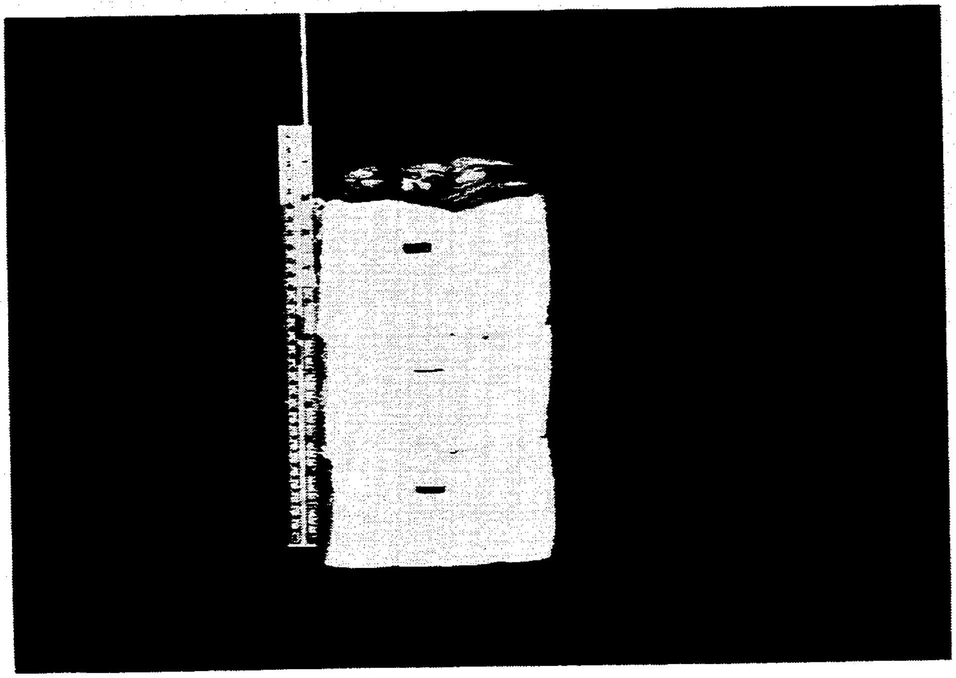
Figure 16:
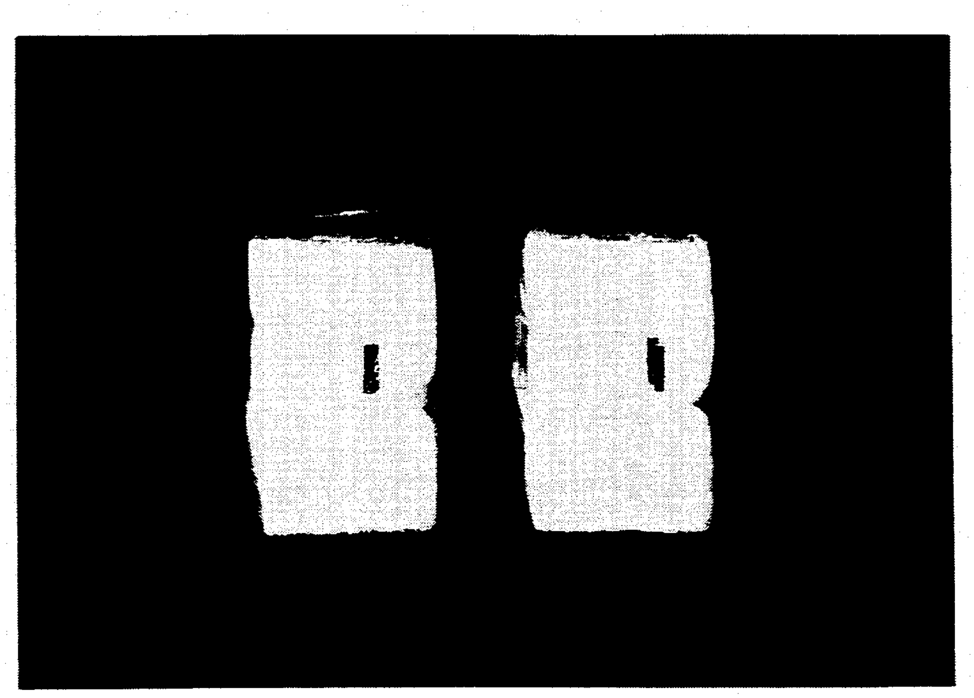
FIG. 16 is a photograph illustrating the puckered appearance of packs of napkins according to the prior art.

In FIG. 14, the stack of napkins on the right is spot embossed and illustrates acceptable but not outstanding stacking characteristics while the stack of coin edge embossed napkins on the left appears ready to fall over. In FIG. 15, the stack of napkins is spot embossed in the central corner of the quarter folded napkin as in Item 1 of FIG. 5. This design demonstrates acceptable stacking characteristics but is accompanied by a significant amount of puckering. FIG. 16 and the left hand stack in FIG. 18 illustrate the puckering of this design more clearly.

Figure 5:
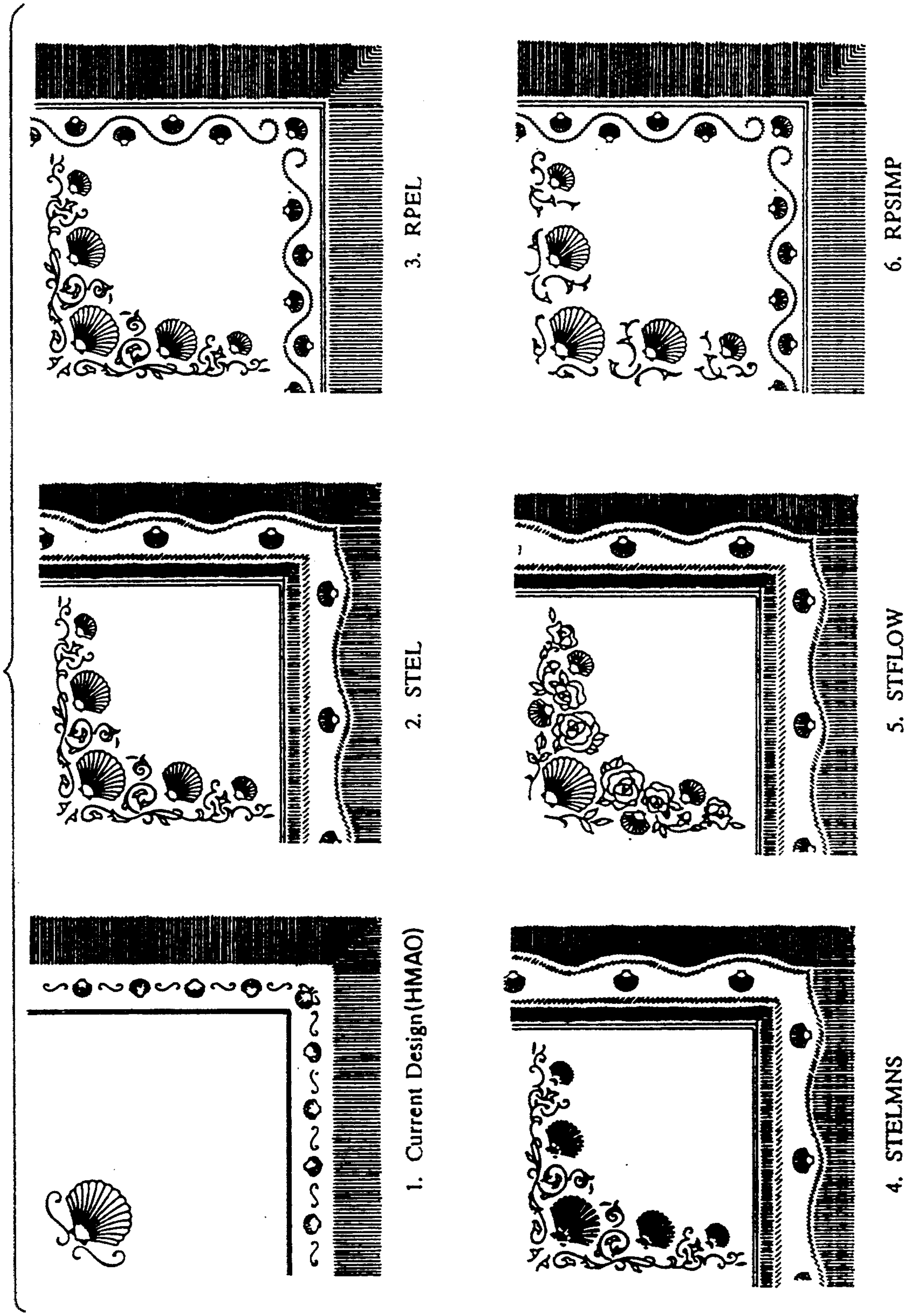
FIG. 5 is a plan view of a variety of alternative quarter folded napkin embodiments of the present invention (Items 2–6) and a comparative quarter folded napkin which is not part of the present invention (Item 1).
Figure 17:
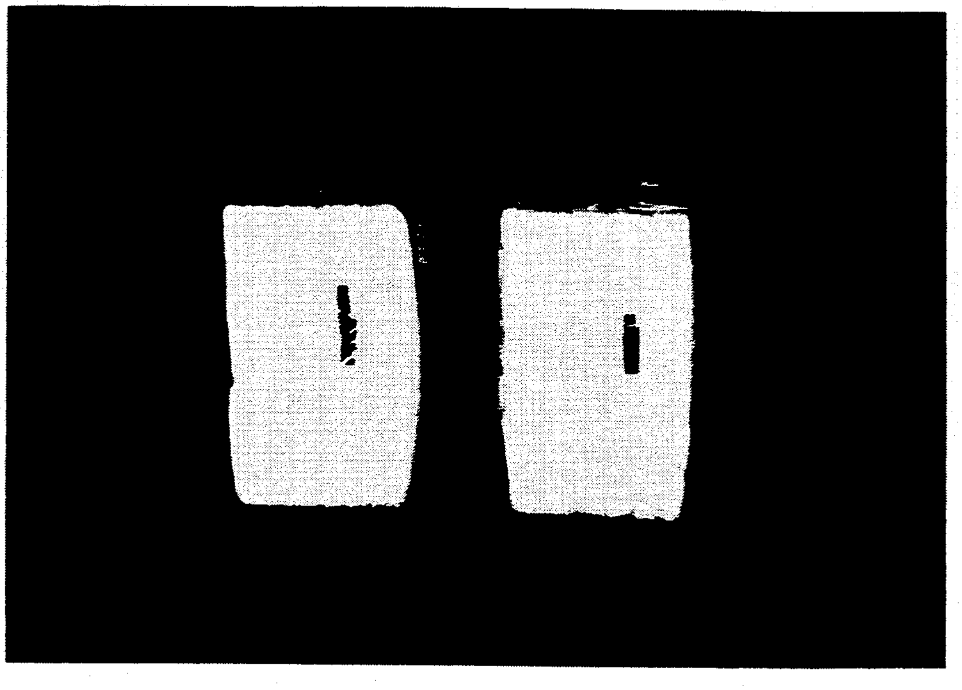
FIG. 17 is a photograph illustrating the unpuckered appearance of packs of napkins according to the present invention.
Figure 18:
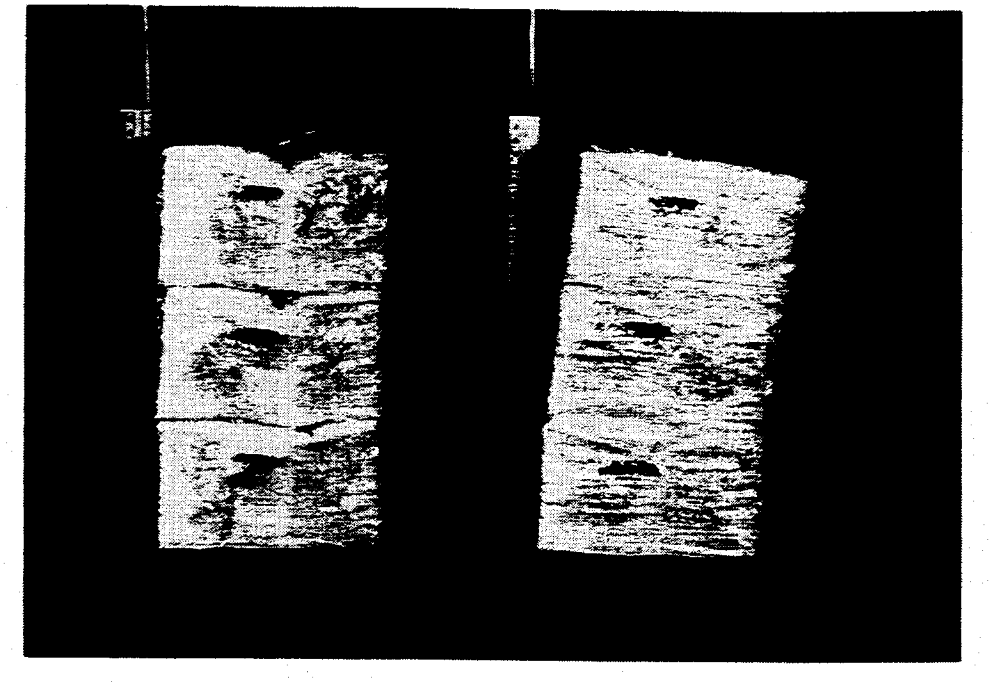
FIG. 18 is a photograph illustrating the puckered appearance of a stack of packs of napkins according to the prior art as compared to the appearance of a stack of napkins of the present invention.

FIG. 17 illustrates unpuckered packs of napkins of the present invention having the functional design shown in FIGS. 1 and 2, while FIG. 18 illustrates the improvement in resistance to puckering of a napkin having the functional design of FIGS. 1 and 2 (right-hand stack) when compared to a napkin having the design of Item 1 of FIG. 5 (left-hand stack). We believe that the slight lopsidedness of the right-hand stack of FIG. 18 (present invention) was an anomaly due to the fact that the coin edge of the roll had not been completely run in when the napkins were embossed.

The comparative summary provided in Table 1 below illustrates the overall benefits and advantages of the multi-ply napkin of the present invention when compared to other well known and currently available multi-ply napkins. The summary reflects the overall, superior character of the multi-ply napkin of the present invention as evidenced by the photographs of FIGS. 14–18.

TABLE 1

| Functional Need: | + | 0 | − |
|---|---|---|---|
| 1. Even Bulk | O,N | S | CE |
| 2. Ply-bonds well | CE | N,S | O |
| 3. Large, smooth, wiping area | CE,N | S | O |
| 4. Resistant to Failure | O,N | S | CE |
| 5. Stackable | O | N,S | CE |

Key:
CE = Coin Edge;
O = Overall;
S = Spot/Coin; and
N = Invention
In Table 1, "+" means that the performance of the design indicated is desirable, while "0" indicates that the performance is acceptable and "−" indicates that the performance is undesirable or needs improvement.

EXAMPLE 2

In this example, the buckling loads of a comparative mult-iply napkin and multi-ply napkins of the present invention are compared. The six quarter folded napkin designs shown in FIG. 5 were each formed from 2 plies of tissue having a basis weight of 10 lbs/3000 sq. ft. ream. Napkins of each design were embossed, folded, trimmed, and stacked by hand. The napkins were embossed at 900 psi using a flat emboss plate and a soft rubber mat. Item 1 in FIG. 5 is a comparative multi-ply napkin while each of Items 2–6 are multi-ply napkins of the present invention. The designations underneath each of Items 2–6 are acronyms reflecting the particular functional design being studied.

The buckling loads along each fold direction for each of the 6 designs were then measured using an Instron (20 lbs load cell, minimum extension = −0.5 in, compression rate =0.5 in/min, all samples preloaded to −0.080 lbs before resetting gauge length). A thin flexible sleeve (16" perimeter) was placed around 40 napkins for the half fold test and around 35 napkins for the quarter fold test. The sleeve loosely restrains the napkins during the test to prevent them from falling over. Each sleeve of napkins was placed between guide plates set at a gap of 1.75"–1.875" (half fold, HF) or 1.5"–1.625" (quarter fold, QF) to hold the stack upright during the test. The sample's behavior and the load/deflection curve were video recorded simultaneously. The buckling load was determined by reviewing the video, the raw data, and the load/deflection curve of each sample.

The buckling load is defined, in this work, to be the load at which the napkin stack first begins to pucker, crimp, or collapse in on itself. We believe that the buckling load provides a measure of how well the product will withstand shipping and handling. That is, products with higher buckling loads will survive shipping and handling better and look better on the store shelf than products with low buckling loads.

An analysis of means (ANOM, 95% confidence level) has been used to analyze the results. The format of this analysis quickly communicates the outcome of the experiment. Average loads that fall outside of the decision limits (dotted lines, upper (UDL), and lower (LDL)) are detectably different from the overall grand average of the experiment, X-bar (*Understanding Industrial Experimentation* by Donald J. Wheeler; SPC Press, Inc.; 1990).

Figure 6:
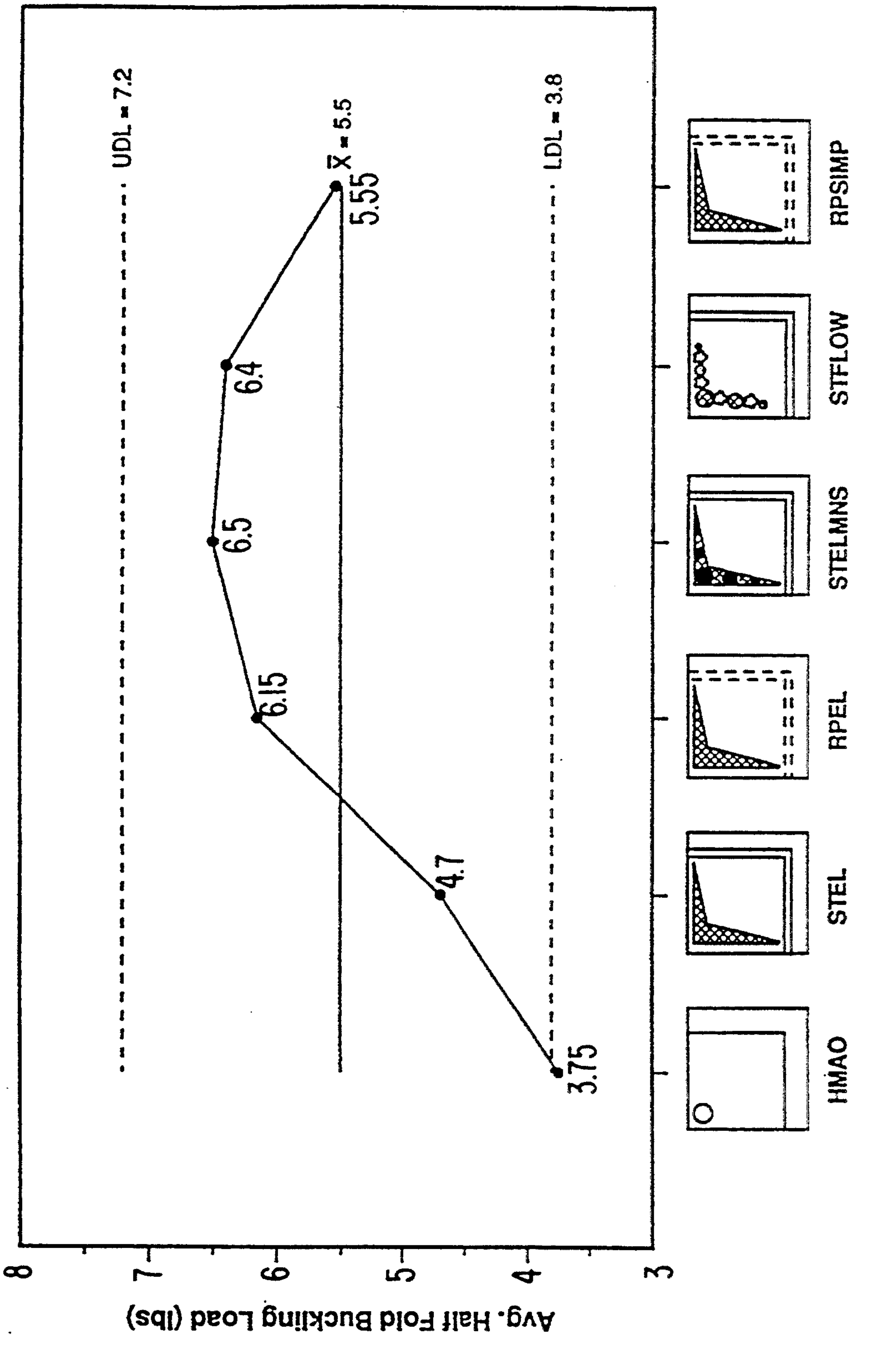
FIG. 6 is a graph of the average half fold buckling load for 40 count stacks of quarter fold napkins corresponding to Items 1–6 of FIG. 5.
Figure 7:
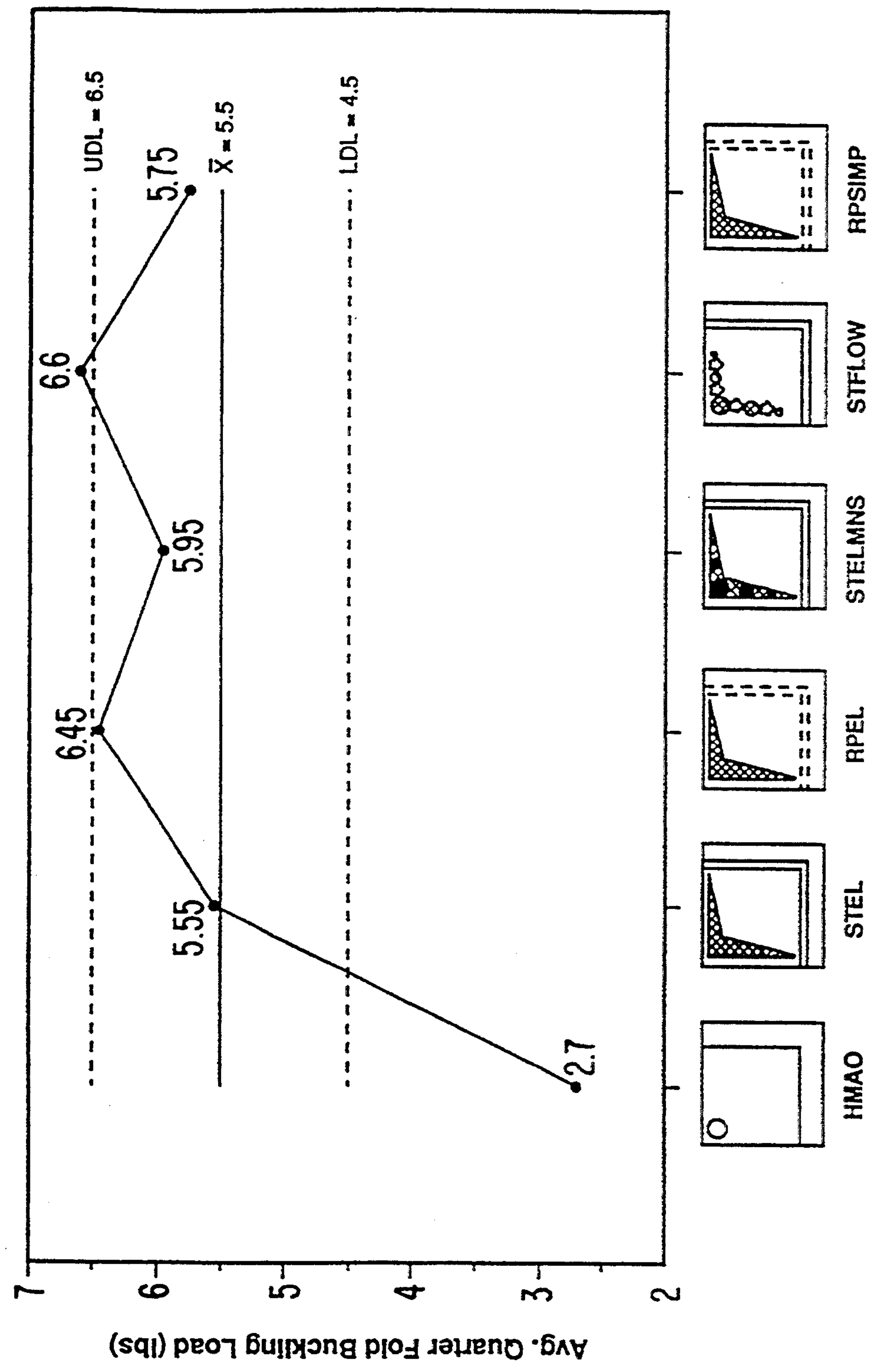
FIG. 7 is a graph of the average quarter fold buckling load for 35 count stacks of quarter fold napkins corresponding to Items 1–6 of FIG. 5.

As seen in the ANOMs of FIGS. 6 and 7, all of the functional designs of the present invention had buckling loads that are statistically higher than the control design, HMAO, illustrated as Item 1 of FIG. 5. On average the new functional designs had buckling loads that were 1.5–2 times higher than the HMAO control design.

One hundred count stacks of each design (Items 1–6) were then sent through a commercial wrapper, and the buckling loads of the wrapped packages measured. The Instron test conditions used were similar to those used for the 40 count stacks except that no plastic sleeve was used as the napkins were effectively restrained within the polyethylene overwraps and guide plate gaps were varied from 3.875" to 4.5" depending on the wrapped stack height and the test to be performed, i.e., whether we were attempting to understand the restrained or unrestrained behavior. The results are shown in FIGS. 8 and 9.

Figure 8:
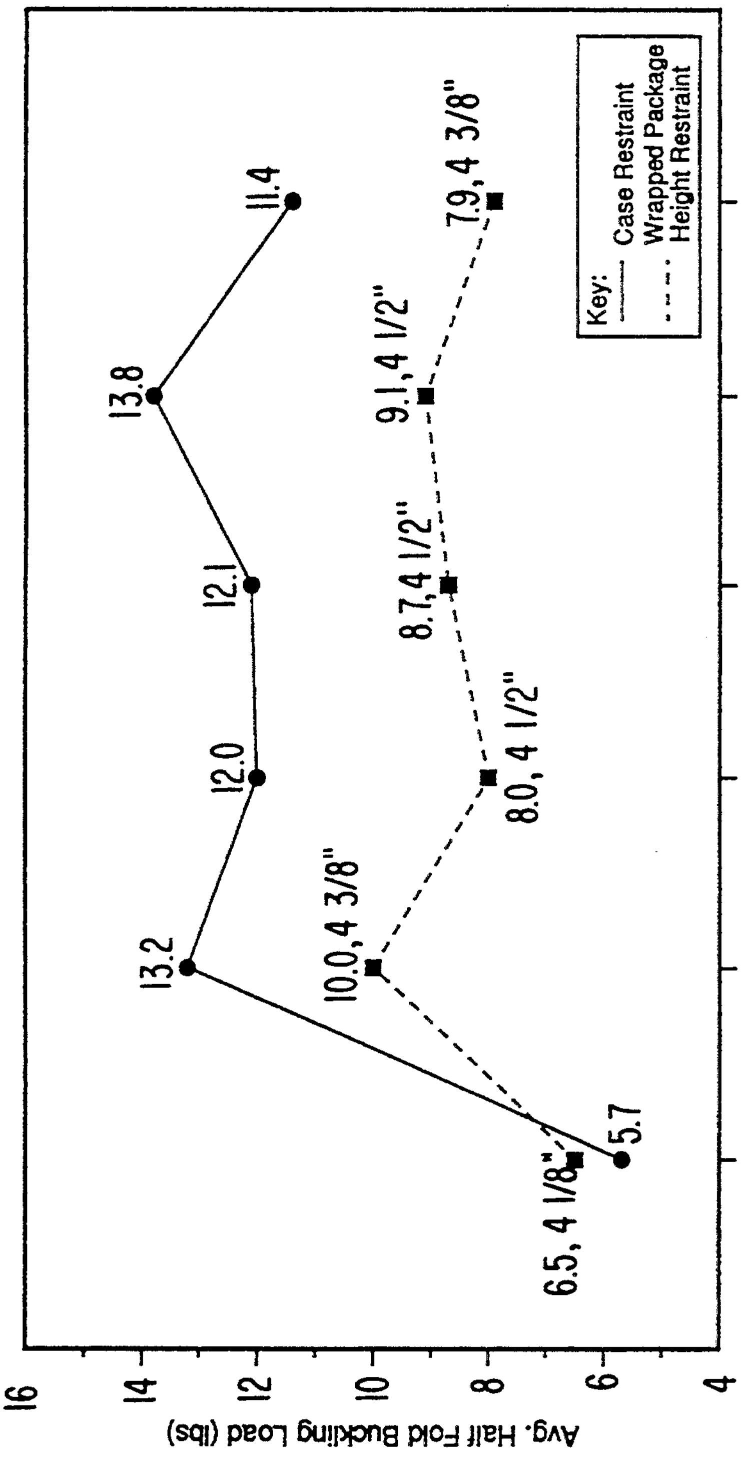
FIG. 8 is a graph of the average half fold buckling loads for machine wrapped 100 count stacks of quarter fold napkins corresponding to Items 1–6 of FIG. 5.
Figure 9:
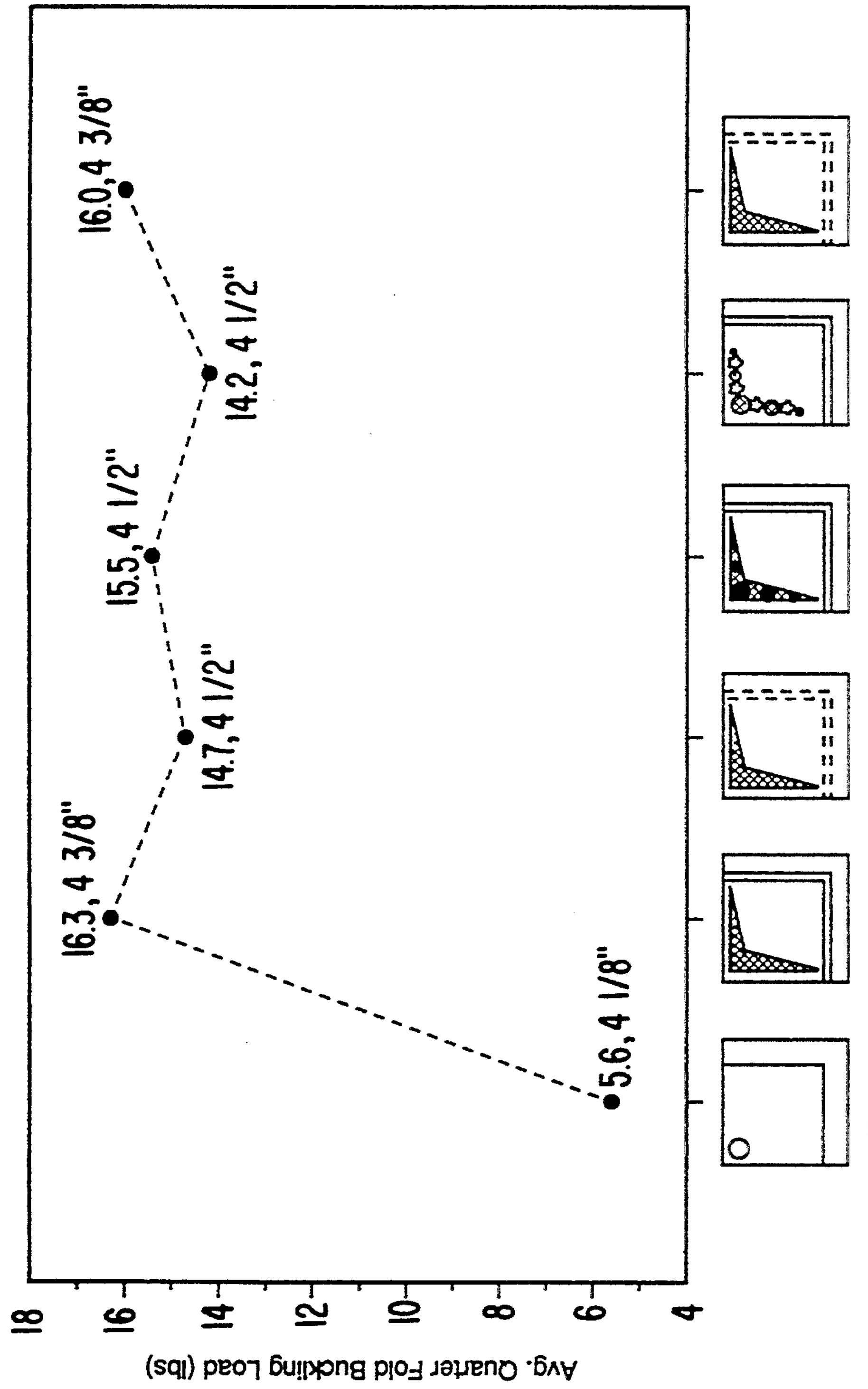
FIG. 9 is a graph of the average quarter fold buckling loads for machine wrapped 100 count stacks of quarter fold napkins corresponding to Items 1–6 of FIG. 5.

The dotted line represents the behavior of effectively unrestrained stacks (guide plates between 4.125" and 4.5" as indicated) while the solid line in FIG. 8 represents the half fold behavior of stacks restrained between a 3.875" guide plate gap. The restrained behavior is believed to be representative of the behavior of the stacks while restrained within the shipping case. Once again, the buckling loads are higher than the control design, HMAO. This test confirms the results obtained with 35 and 40 count stacks and suggests that the new functional designs of the present invention will withstand handling better than the comparative control design.

Throughout these examples, the same base sheet was used for all of the napkins depicted on any single graph. The base sheets used for the napkins represented on one graph, however, were not always the same as the base sheets for different graphs so that the control does not always exhibit the same absolute performance on each graph, but performance of the napkins evaluated relative to the control is indicated reliably.

EXAMPLE 3

Figure 10:
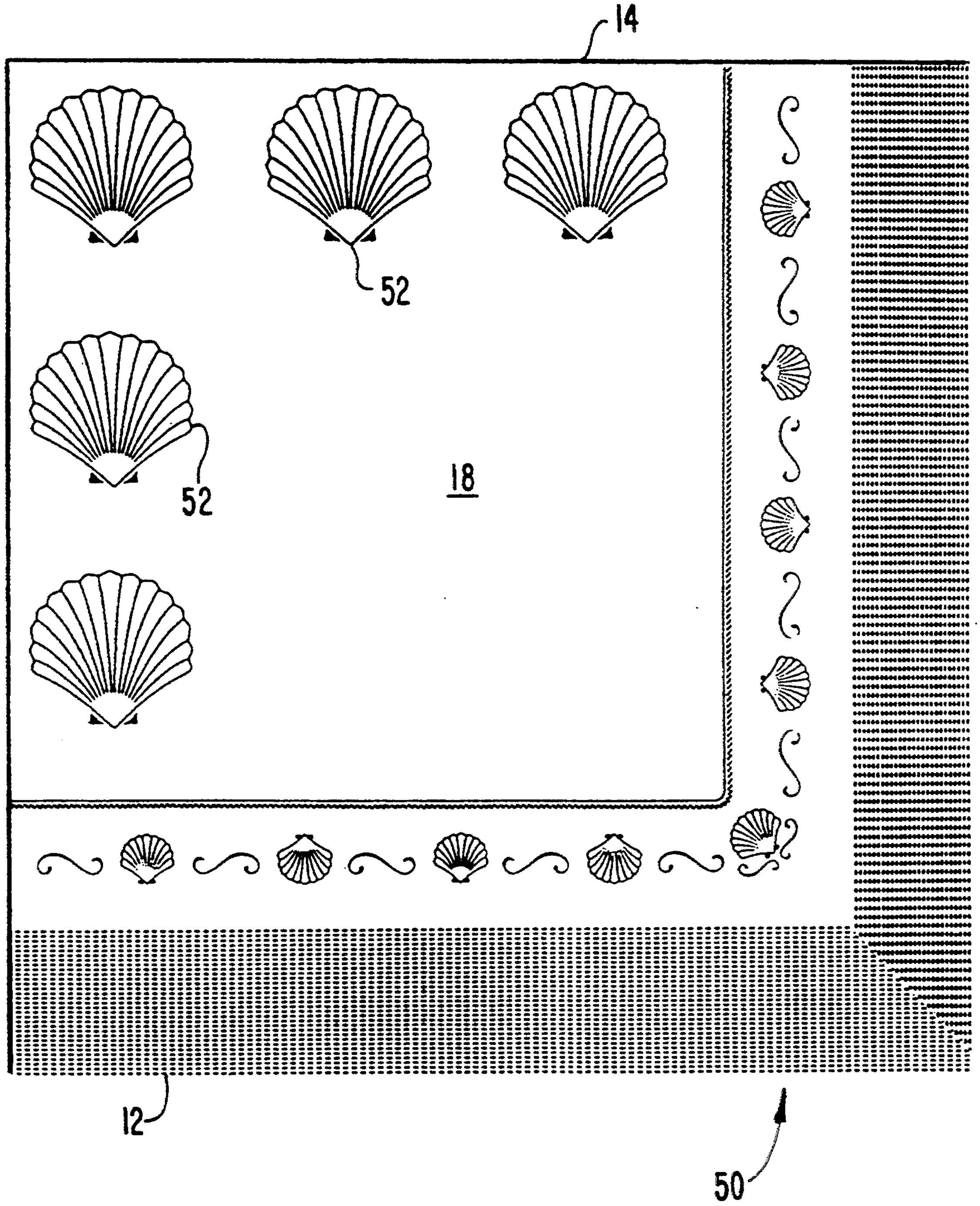
FIG. 10 is a plan view of another embodiment of a quarter folded napkin of the present invention combining 3 discrete elements along the fold lines in a design which is suitable for "all occasion" napkins.
Figure 11:
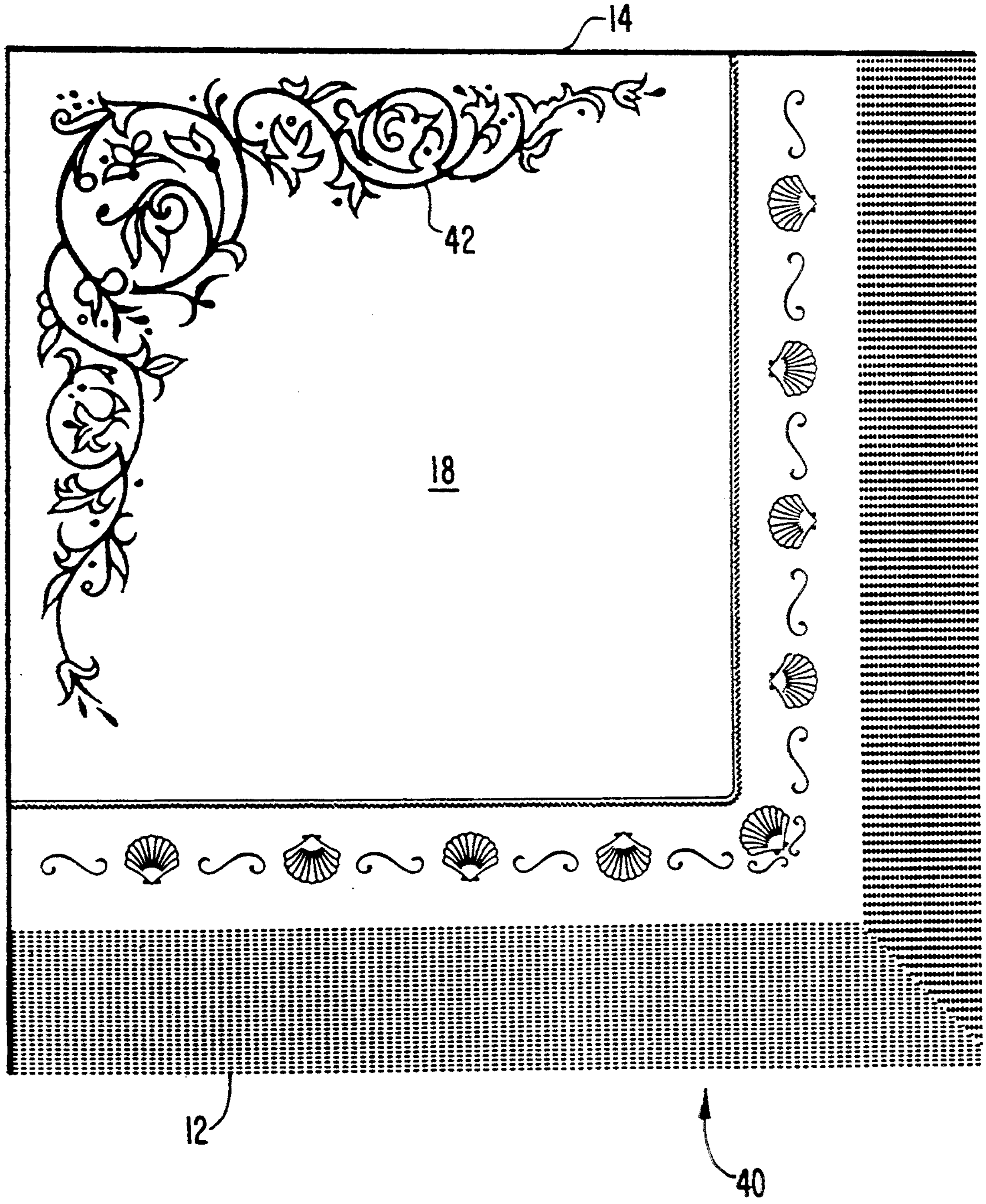
FIG. 11 is a plan view of another embodiment of a quarter folded napkin of the present invention having a continuous "vine" design along the fold lines in a design which is suitable for "all occasion" napkins.

The embodiment of the functional napkin design shown in FIG. 11 and generally referred to as 40 has a continuous element (vine) 42 that roughly occupies the same area as the five discrete elements (3 along each folded edge) 52 in the embodiment of the functional napkin design shown in FIG. 10 and generally referred to as 50. For comparison, napkins of these two functional designs as well as the other designs depicted schematically in FIG. 12 were embossed, folded, trimmed, and stacked by hand. The napkins were embossed at 900 psi using a flat emboss plate and a soft rubber mat. The half fold buckling loads of 40 count stacks and the quarter fold buckling loads of 35 count stacks were then measured using the methods discussed in the previous Example 2 except that a guide plate gap of 1.5" was used for the 35 count stacks and a guide plate gap of 1.75" was used for the 40 count stacks. As in Example 2, the procedures were then repeated with 100 count machine wrapped stacks except that a guide plate gap clearance of 3.875" was used for all of the 100 count measurements.

Figure 12:
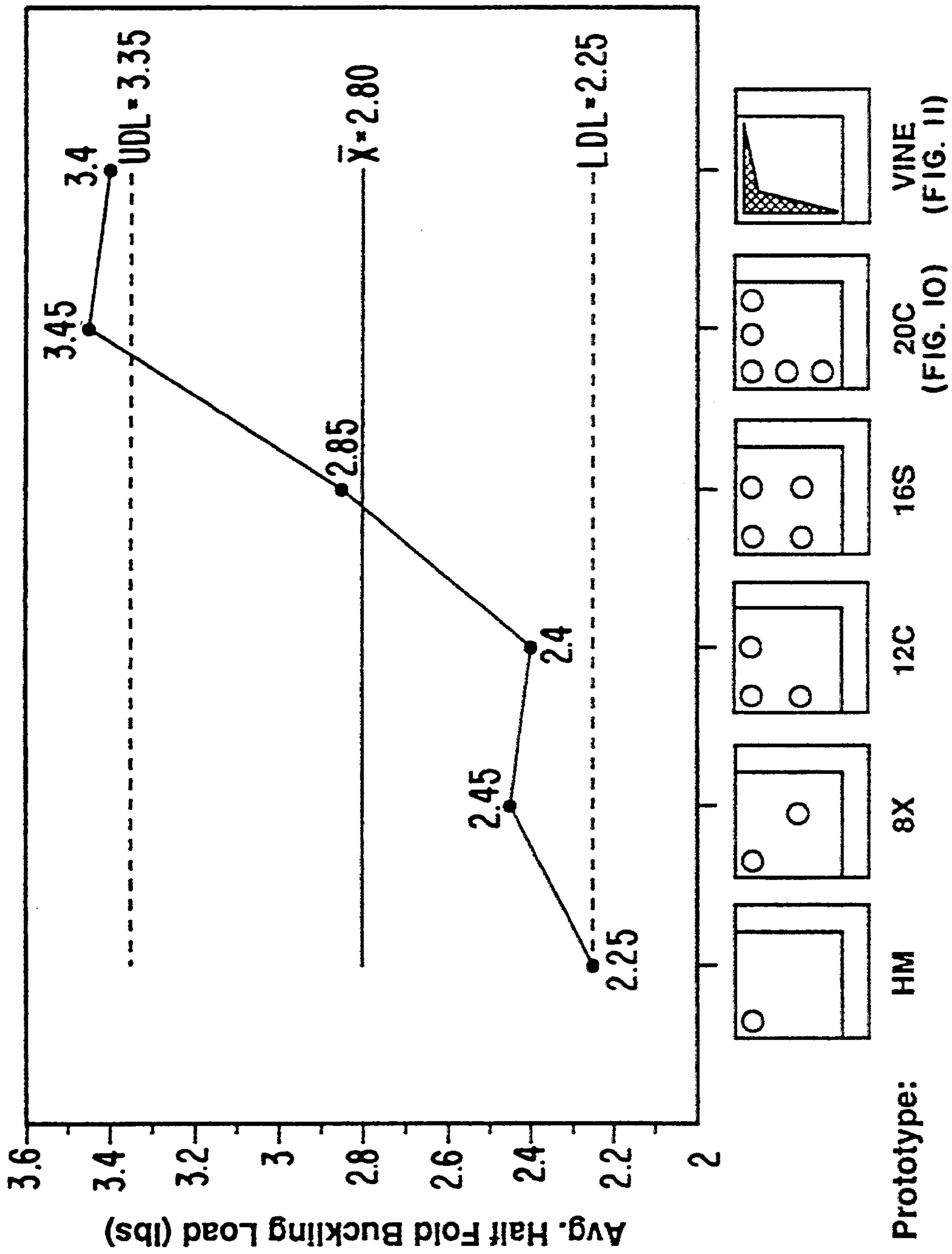
FIG. 12 is a graph of the average half fold buckling load for 40 count stacks of quarter fold napkins corresponding to FIGS. 10 and 11, along with some additional designs.
Figure 13:
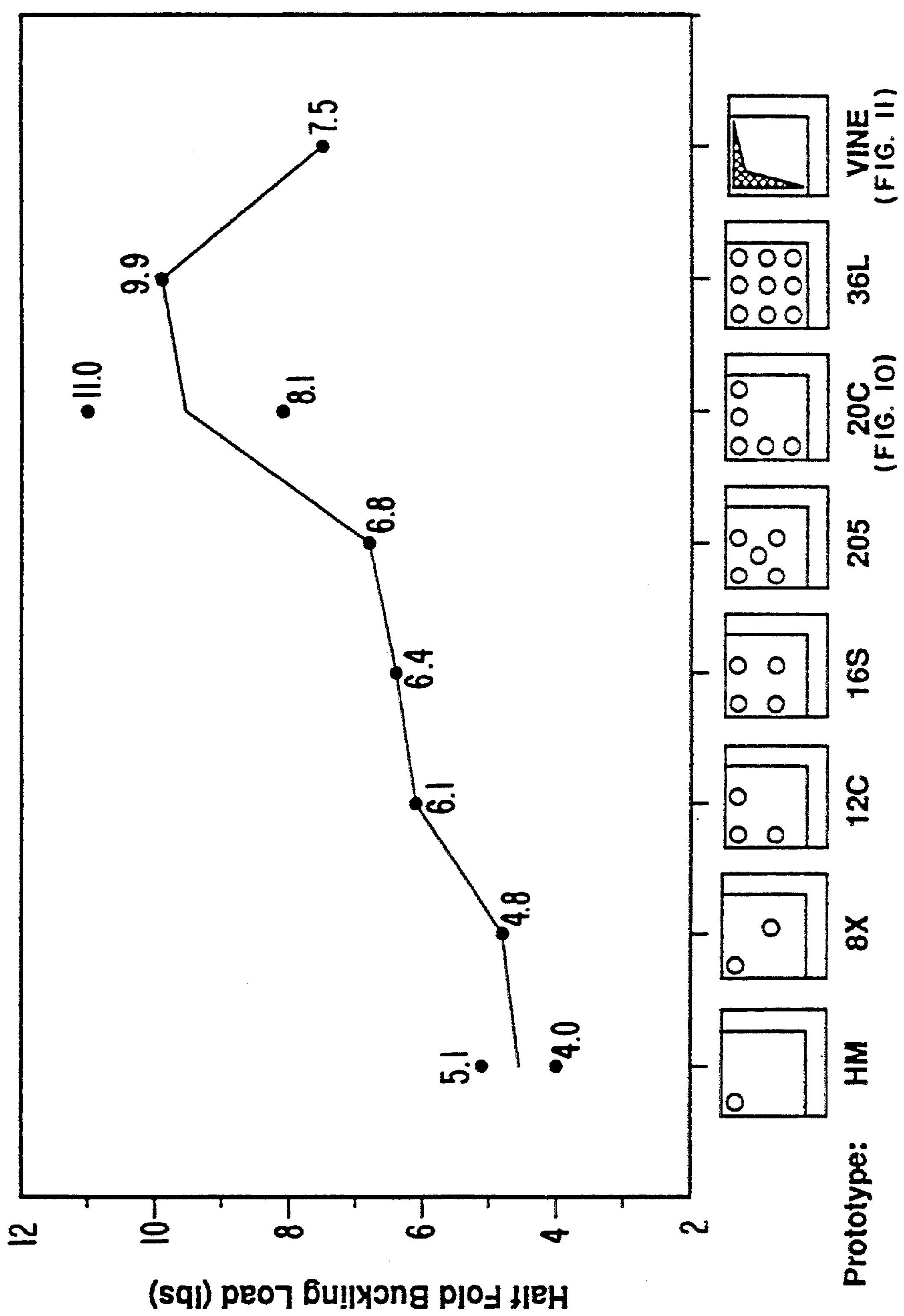
FIG. 13 is a graph of the average half fold buckling loads for machine wrapped 100 count stacks of quarter fold napkins corresponding to FIGS. 10 and 11, along with some additional designs.

The results of the half fold measurements are shown in FIGS. 12 and 13. We have emphasized half fold buckling resistance in this example because we feel that this is most critical for the performance of napkins loaded with the half fold vertical relative to the bottom of the case. Our experience indicates that quarter fold buckling resistance is improved as well.

In the analysis of means (ANOM), the continuous element shown in the functional design of FIG. 11 produces a roughly equivalent buckling load (HF) to the discrete elements of the functional design shown in FIG. 10. Furthermore, the buckling loads of both designs are 50% higher than the control design, HM, in FIG. 12. However, in other measurements comparing the various bucking loads of functional designs having a continuous emboss with the buckling loads of functional designs having discrete elements, the results were not quite as closely matched as those illustrated in FIG. 12, so that functional designs having discrete elements seem to be preferable but roughly equivalent results can be obtained with continuous functional designs. Note that even though design 12C of FIG. 12 shows little advantage in 40 count stacks, in the 100 count machine wrapped stacks shown in FIG. 13, a significant increase in buckling load is observed.

By engineering an emboss pattern that effectively covers the folded edge perimeter of the napkin, the present inventors have been able to increase the product's buckling load, optimize the available unembossed area for wiping, create a uniform stack, and make an attractive napkin. These benefits further cascade to produce an easily wrapped stack, that stacks well on the store shelf and is less prone to objectionable, puckering or buckling failure.

It will be apparent to those skilled in the art that various modifications and variations can be made to the multi-ply napkin of the present invention without departing from the spirit or scope of the invention. Thus, it is intended that the present invention cover the modifications and variations of this invention provided they come within the scope of the appended claims and their equivalents.

We claim:

1. A multi-ply napkin having a functional emboss design and increased resistance to puckering comprising a coin embossed edge, an embossed folded edge, and an unembossed wiping surface.

2. The multi-ply napkin of claim 1 having an even bulk distribution.

3. The multi-ply napkin of claim 1 wherein said embossed folded edge comprises at least two discrete, principal emboss elements, evenly spaced along said folded edge.

4. The multi-ply napkin of claim 3 wherein said embossed folded edge comprises three discrete, principal emboss elements, evenly spaced along said folded edge.

5. The multi-ply napkin of claim 3 wherein said embossed folded edge comprises four discrete, principal emboss elements, evenly spaced along said folded edge.

6. The multi-ply napkin of claim 1 wherein said embossed folded edge comprises a single continuous, principal emboss element, along said folded edge.

7. The multi-ply napkin of claim 3 wherein said embossed folded edge further comprises secondary emboss elements.

8. The multi-ply napkin of claim 6, wherein said embossed folded edge further comprises secondary emboss elements.

9. A multi-ply napkin having a functional emboss design with increased resistance to puckering and an even bulk distribution, comprising an embossed edge, an embossed folded edge and an unembossed wiping surface.

10. A paper napkin having a functional emboss design comprising an embossed edge, an unembossed wiping surface, and means for:

controlling the locations at which pucker points can form along an embossed folded edge comprising an elongated embossed region arrayed along said folded edge.

11. The paper napkin of claim 10 wherein said elongated embossed region arrayed along said edge comprises a plurality of discrete embosses.

12. The paper napkin of claim 10 wherein said elongated embossed region arrayed along said edge comprises a continuous emboss.

13. A paper napkin having a functional emboss design comprising an embossed edge, an unembossed wiping surface, and means for:

increasing the bulk and stack height of portions of the napkin opposite said embossed edge to the bulk and stack height of said embossed edge to promote even bulk distribution as well as controlling the locations at which pucker points can form along an embossed folded edge comprising an elongated embossed region arrayed along said folded edge and spaced from said folded edge.

14. The paper napkin of claim 13 wherein said elongated embossed region arrayed along said edge comprises a plurality of discrete embosses.

15. The paper napkin of claim 13 wherein said elongated embossed region arrayed along said edge comprises a continuous emboss.

16. A paper napkin having a functional emboss design comprising an embossed edge, an unembossed wiping surface, and means for:

increasing the bulk and stack height of portions of the napkin along an embossed folded edge and opposite said embossed edge to the bulk and stack height of said embossed edge to promote even bulk distribution comprising an elongated embossed region arrayed along said folded edge.

17. The paper napkin of claim 16 wherein said elongated embossed region arrayed along said edge comprises a plurality of discrete embosses.

18. The paper napkin of claim 16 wherein said elongated embossed region arrayed along said edge comprises a continuous emboss.

* * * * *